United States Patent
Ishida et al.

(10) Patent No.: US 11,990,855 B2
(45) Date of Patent: May 21, 2024

(54) ROTATING BODY DRIVE SYSTEM

(71) Applicant: DENSO CORPORATION, Kariya (JP)

(72) Inventors: Minoru Ishida, Kariya (JP); Tsubasa Sakuishi, Kariya (JP); Yuki Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 45 days.

(21) Appl. No.: 17/706,739

(22) Filed: Mar. 29, 2022

(65) Prior Publication Data

US 2022/0224257 A1  Jul. 14, 2022

Related U.S. Application Data (63) Continuation of application No. PCT/JP2020/036485, filed on Sep. 25, 2020.

(30) Foreign Application Priority Data

Oct. 1, 2019  (JP) .................................. 2019-181703

(51) Int. Cl.
  *H02P 5/74* (2006.01)
  *B60K 1/02* (2006.01)
  *B60L 15/20* (2006.01)

(52) U.S. Cl.
  CPC ................ *H02P 5/74* (2013.01); *B60L 15/20* (2013.01); *B60K 1/02* (2013.01)

(58) Field of Classification Search
  CPC .. H02P 5/74; H02P 29/028; H02P 6/04; H02P 29/032; H02P 2006/045; H02P 1/54; H02P 6/32; H02P 6/08; H02P 21/22; H02P 23/07; H02P 25/00; H02P 25/062; H02P 25/064; H02P 25/107; H02P 27/00; H02P 27/04; H02P 27/06; H02P 27/08; H02P 29/00; H02P 2101/45; B60L 15/20; B60L 15/007; B60L 2200/10; B60L 7/003; B60L 2220/42; B60K 1/02; B60K 7/0007; H02M 1/088; H02M 7/53871
  See application file for complete search history.

(56) References Cited

U.S. PATENT DOCUMENTS

2019/0214931 A1* 7/2019 Minegishi ............... B60L 3/003

FOREIGN PATENT DOCUMENTS

| EP | 3 431 366 A1 | 1/2019 | |
|----|----|----|----|
| JP | H07194187 A | * 7/1995 | |
| JP | 2009-35243 A | 2/2009 | |
| JP | 2015-109775 A | 6/2015 | |
| JP | 2015109775 A | * 6/2015 | ................ H02P 5/74 |

* cited by examiner

*Primary Examiner* — Antony M Paul
(74) *Attorney, Agent, or Firm* — Oliff PLC (57) ABSTRACT

A drive system establishes a normal state in which a first switch is ON and a gang switch is OFF, in the case where it is determined that there is no abnormality in the state of a first rotating body driven by a first motor. In this normal state, the first motor is driven by a first inverter, while a second motor is driven by a second inverter. It the case where it is determined that there is abnormality in the state of the first rotating body, a first countermeasure state is established in which the first switch is OFF and the gang switch is ON. In this first countermeasure state, the second motor is driven by both the first inverter and the second inverter.

10 Claims, 7 Drawing Sheets

ROTATING BODY DRIVE SYSTEM

CROSS-REFERENCE TO RELATED APPLICATION

This application is the U.S. bypass application of International Application No. PCT/JP2020/036485 filed on Sep. 25, 2020 which designated the U.S. and claims priority to Japanese Patent Application No. 2019-181703 filed on Oct. 1, 2019, the contents of both of which are incorporated herein by reference.

TECHNICAL FIELD

The present disclosure relates to rotating body drive systems that drive rotating bodies.

BACKGROUND

Vehicle drive systems are often provided with a plurality of drive systems (power systems) each including a motor that drives a wheel and an inverter that drives the motor. Such a technique is shown in JP 2009-35243 A.

SUMMARY

A rotating body drive system according to the present disclosure includes a first motor driving a predetermined first rotating body, a second motor driving a second rotating body different from the first rotating body, a first inverter driving the first motor, and a second inverter driving the second motor.

The rotating body drive system further includes a first switch, a gang switch, a determination unit, and a control unit. The first switch, when turned ON, connects between the first inverter and the first motor so that current can be passed therethrough and, when turned OFF, disconnects the connection. The gang switch, when turned ON, connects between the first inverter and the second motor so that current can be passed therethrough and, when turned OFF, disconnects the connection. The determination unit determines whether the first rotating body is in an abnormal state. The control unit controls the first switch and the gang switch.

BRIEF DESCRIPTION OF THE DRAWINGS

The above features of the present disclosure will be made clearer by the following detailed description, given referring to the appended drawings. In the accompanying drawings.

DETAILED DESCRIPTION OF THE PREFERRED EMBODIMENTS

According to the vehicle drive systems in JP 2009-35243 A, malfunctions that could occur in any of the drive systems can be compensated by other drive systems. Therefore, vehicles are prevented from being brought into a state in which they cannot travel.

However, even with such vehicle drive systems, if any of the drive wheels has been caught in mud, snow, or the like on the road surface or run on a frozen road which deteriorates traction of the wheel, only the torque of the wheels other than the wheel in question can be transferred to the ground, as in normal vehicle drive systems. Therefore, it will be difficult, for the vehicle to escape from the mud, snow, or the like on the road surface or the frozen road.

To ensure traveling performance which is sufficient for the vehicle to move out of the mud, snow, or the like on the road surface or the frozen road, using only the torque of the drive wheels other than the drive wheel deteriorated in traction, it will be necessary to use high power inverters.

Similar issues could be raised in rotating body drive systems other than the vehicle drive systems. Specifically, in drone drive systems, for example, if one or more propellers of the drone have broken down due to damage or the like, the drone has to perform a soft landing while maintaining flight, using only the power of the remaining propellers. In this case, to ensure flight performance sufficient for the drone to maintain flight using only the remaining propellers, it will be necessary to use high power inverters.

The present disclosure has been made in light of the circumstances described above and mainly aims that, in a predetermined abnormal state of a rotating body, sufficiently high power is ensured in other rotating bodies without the need of providing a high-power inverter.

A rotating body drive system according to the present disclosure includes a first motor driving a predetermined first rotating body, a second motor driving a second rotating body different from the first rotating body, a first inverter driving the first motor, and a second inverter driving the second motor.

The rotating body drive system further includes a first switch, a gang switch, a determination unit, and a control unit. The first switch, when turned ON, connects between the first inverter and the first motor so that current can be passed therethrough and, when turned OFF, disconnects the connection. The gang switch, when turned ON, connects between the first inverter and the second motor so that current can be passed therethrough and, when turned OFF, disconnects the connection. The determination unit determines whether the first rotating body is in an abnormal state. The control unit controls the first switch and the gang switch.

In the rotating body drive system, the control unit establishes a normal state in which the first switch is ON and the gang switch is OFF in the case where the determination unit determines that there is no abnormality in the state of the first rotating body. In this normal state, the first motor is driven by the first inverter, while the second motor is driven by the second inverter.

On the other hand, in the rotating body drive system, the control unit establishes a first countermeasure state in which the first switch is OFF and the gang switch is ON in the case where the determination unit determines that there is abnormality in the state of the first rotating body. In this first countermeasure state, the second motor is driven by both the first inverter and the second inverter.

According to the present disclosure, in the case where the determination unit determines that there is abnormality in the state of the first rotating body, the control unit establishes a first countermeasure state so that the second motor can be driven by both the first inverter and the second inverter.

Accordingly, compared to the case where the second motor is driven using only the second inverter, torque of the second rotating body can be enhanced. Thus, sufficiently high power can be ensured in the second rotating body when the first rotating body is in an abnormal state, without the need of providing a high-power second inverter.

First Embodiment

Referring to the drawings, some embodiments of the present disclosure will be described. It should be noted, however, that the present disclosure should not be construed as being limited to these embodiments but may be appropriately modified and implemented in the scope not departing from the spirit of the present disclosure.

Figure 1:
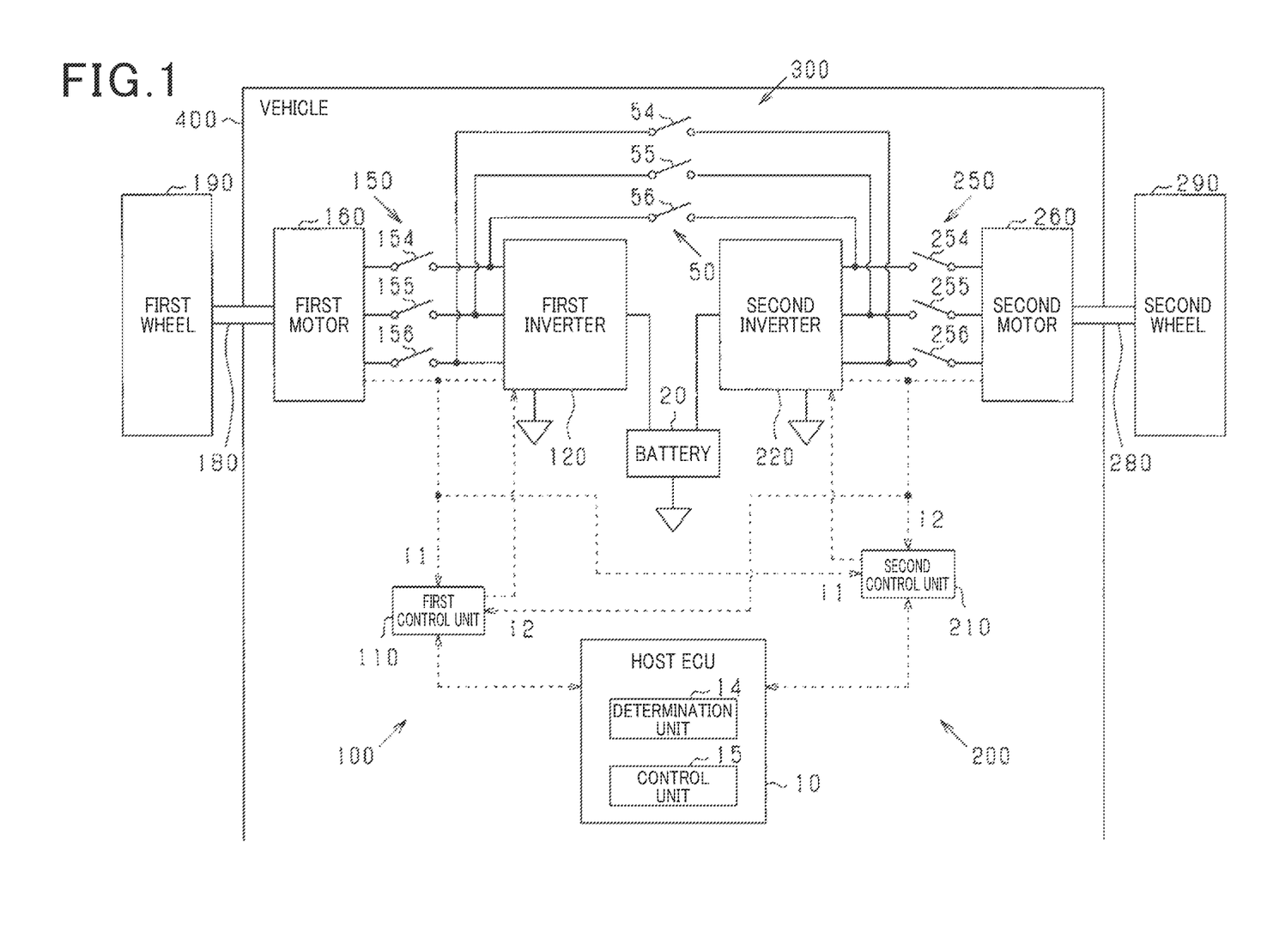
FIG. 1 is a schematic diagram illustrating a rotating body drive system according to a first embodiment.

FIG. 1 is a schematic diagram illustrating a vehicle drive system 300 according to the present embodiment. The vehicle drive system is installed in a vehicle 400, and includes a host ECU 10, a battery 20, a first drive system 100, a second drive system 200, and a gang switch 50.

The first drive system 100 includes a first wheel 190, a first motor 160, a first inverter 120, a first control unit 110, and a first switch 150. In the present embodiment, the first wheel 190 corresponds to a front-left wheel and is rotated together with a first rotary shaft 180.

When the first rotary shaft 180 is rotatably driven via reduction gears or the (not shown), the first motor 160 rotatably drives the first wheel 190. The first inverter 120 converts power of direct current supplied from the battery 20 into alternating current and supplies the converted alternating current to the first motor 160 to drive the first motor 160. The first control unit 110 controls the first inverter 120 to control the first motor 160 driving the first wheel 190.

Specifically, the first drive system 100 inputs first motor information i1 obtained based on the first motor 160 being driven, into the first control unit 110. The first motor information i1 may include, for example, information related to rotation angle of the rotor of the first motor 160 relative to the stator thereof, information related to current passed through a U-phase coil 164, a V-phase coil 165, and a W-phase coil 166 of the stator of the first motor 160, or other information. The first control unit 110 controls the first inverter 120 using the first motor information i1 to control the first wheel 190 being driven.

The second drive system 200 includes a second wheel 290, a second motor 260, a second inverter 220, a second control unit 210, and a second switch 250. The second wheel 290 corresponds to a front-right wheel and is rotated together with a second rotary shaft 280.

A more specific description of the second drive system 200 is similar to the description of the first drive system 100 above, reading as follows. In other words, the term first can be read as second, the term left can be read as right, the term U phase can be read as X phase, the term V phase can be read as Y phase, the term W phase can be read as Z phase, and the reference signs can be read as corresponding reference signs.

Figure 2:
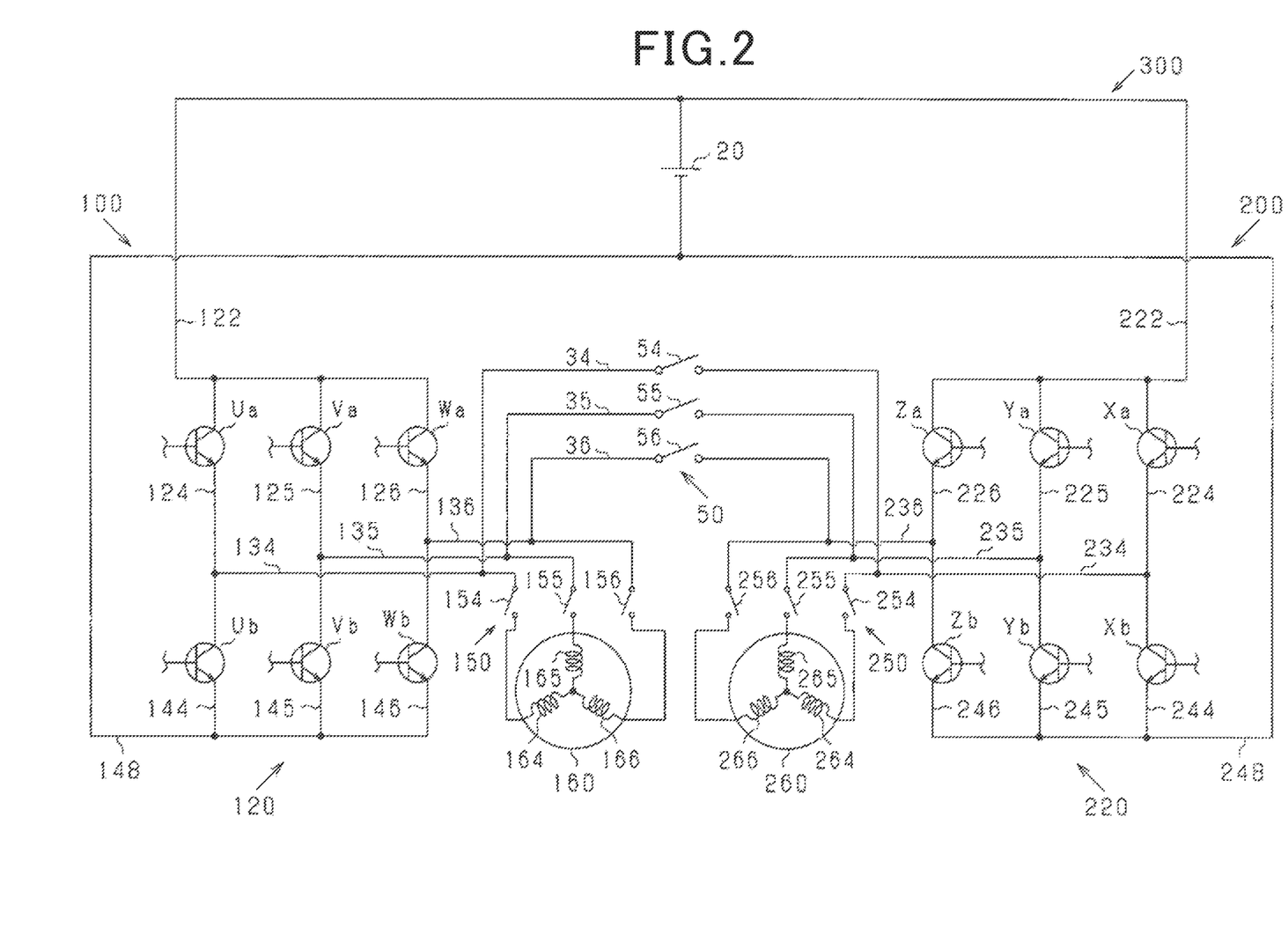
FIG. 2 is a circuit diagram illustrating a rotating body drive system.

FIG. 2 is a circuit diagram illustrating the vehicle drive system 300. First, the first drive system 100 will be described. The first motor 160 includes a U-phase coil 164, a V-phase coil 165, and a W-phase coil 166, with first ends of these coils being connected to each other via a neutral point.

The first inverter 120 includes a first upper wiring 122, three upper arms (124 to 126), three connecting wires (134 to 136), three lower arms (144 to 146), and a first lower wiring 148.

The first upper wiring 122 has a first end connected to the positive terminal of the battery 20. The first lower wiring 148 has a first end connected to the negative terminal of the battery 20.

The three connecting wires (134 to 136) include a U-phase wire 134, a V-phase wire 135, and a W-phase wire 136. The U-phase wire 134 has a first end connected to an end of the U-phase coil 164 opposite to the neutral point. The V-phase wire 135 has a first end connected to an end of the V-phase coil 165 opposite to the neutral point. The W-phase wire 136 has a first end connected to an end of the W-phase coil 166 opposite to the neutral point.

The three upper arms (124 to 126) include a U-phase upper arm 124, a V-phase upper arm 125, and a W-phase upper arm 126. The U-phase upper arm 124 has a first end connected to the first upper wiring 122, and a second end connected to the U-phase wire 134. Also, the U-phase upper arm 124 is provided with a U-phase upper switch Ua at an intermediate portion thereof in the length direction. The V-phase upper arm 125 has a first end connected to the first upper wiring 122, and a second end connected to the V-phase wire 135. Also, the V-phase upper arm 125 is provided with a V-phase upper switch Va at an intermediate portion thereof in the length direction. The W-phase upper arm 126 has a first end connected to the first upper wiring 122, and a second end connected to the W-phase wire 136. Also, the W-phase upper arm 126 is provided with a W-phase upper switch Wa at an intermediate portion thereof in the length direction.

The three lower arms (144 to 146) include a U-phase lower arm 144, a V-phase lower arm 145, and a W-phase lower arm 146. The U-phase lower arm 144 has a first end connected to the first lower wiring 148, and a second end connected to the U-phase wire 134. Also, the U-phase lower arm 144 is provided with a U-phase lower switch Ub at an intermediate portion thereof in the length direction. The V-phase lower arras 145 has a first end connected to the first lower wiring 148, and a second end connected to the V-phase wire 135. Also, the V-phase lower arm 145 is provided with a V-phase lower switch Vb at an intermediate portion thereof in the length direction. The W-phase lower arm 146 has a first end connected to the first lower wiring 148, and a second end connected to the W-phase wire 136. Also, the W-phase lower a 146 is provided with a W-phase lower switch Wb at an intermediate portion thereof in the length direction.

The three connecting wires (134 to 136) are provided with the first switch 150. Specifically, the first switch 150 includes a U-phase switch 154, a V-phase switch 155, and a W-phase switch 156. The U-phase switch 154 is provided between the upper and lower arms (124, 144) of the U-phase wire 134 and the U-phase coil 164. The V-phase switch 155 is provided between the upper and lower arms (125, 145) of the V-phase wire 135 and the V-phase coil 165. The W-phase switch 156 is provided between the upper and lower arms (126, 146) of the W-phase wire 136 and the W-phase coil 166.

In the following description, the expression that the first switch 150 is ON refers to that the three switches (154 to 156) configuring the first switch 150 are all ON, and the expression that the first switch 150 is OFF refers to that the three switches (154 to 156) are all OFF. The first switch 150, when turned ON, connects between the first inverter 120 and the first motor 160 so that current can be passed therethrough and, when turned OFF, disconnects the connection.

The first control unit 110 controls ON and OFF states of the three upper switches (Ua, Va, Wa) and the three lower switches (Ub, Vb, Wb) to control the first inverter 120.

Next, the second drive system 200 will be described. The second motor 260 includes an X-phase coil 264, a Y-phase coil 265, and a Z-phase coil 266. The second inverter 220 includes a second upper wiring 222, three upper arms (224 to 226), three connecting wires (234 to 236), three lower arms (244 to 246), and a second lower wiring 248.

The three upper arms (224 to 226) include an X-phase upper arm 224, a Y-phase upper arm 225, and a Z-phase upper arm 226. The X-phase upper arm 224 is provided with an X-phase upper switch Xa, the Y-phase upper arm 225 is provided with a Y-phase upper switch Ya, and the Z-phase upper arm 226 is provided with a Z-phase upper switch Za.

The three lower arms (244 to 246) include an X-phase lower arm 244, a Y-phase lower arm 245, and a Z-phase lower arm 246. The X-phase lower arm 244 is provided with an X-phase lower switch Xb, the Y-phase lower arm 245 is provided with a Y-phase lower switch Yb, and the Z-phase lower arm 246 is provided with a Z-phase lower switch Zb.

The three phase wirings (234 to 236) include an X-phase wire 234, a Y-phase wire 235, and a Z-phase wire 236. The second switch 250 includes an X-phase switch 254, a Y-phase switch 255, and a Z-phase switch 256.

A more specific description of the second drive system 200 is similar to the description of the first drive system 100 above, reading as follows. In other words, the term first can be read as second, the term U phase can be read as X phase, the term V phase can be read as Y phase, the term W phase can be read as Z phase, and the reference signs can be read as corresponding reference signs.

Next, the gang switch 50 will be described. The gang switch 50 includes a UX gang switch 54, a VY gang switch 55, and a WZ gang switch 56. Specifically, a battery 20-side portion of the U-phase wire 134 with reference to the U-phase switch 154 (the side opposite to the first motor 160) is connected to a battery 20-side portion of the X-phase wire 234 with reference to the X-phase switch 254, via a UX coupling wire 34. The UX coupling wire 34 is provided with the UX gang switch 54.

Also, a battery 20-side portion of the V-phase wire 135 with reference to the V-phase switch 155 is connected to a battery 20-side portion of the Y-phase wire 235 with reference to the Y-phase switch 255, via a VY coupling wire 35. The VY coupling wire 35 is provided with the VY gang switch 55. Furthermore, a battery 20-side portion of the W-phase wire 136 with reference to the W-phase switch 156 is connected to a battery 20-side portion of the Z-phase wire 236 with reference to the Z-phase switch 256, via a WZ coupling wire 36. The WZ coupling wire 36 is provided with the WZ gang switch 56.

In the following description, the expression that the gang switch 50 is ON refers to that the three switches (54 to 56) configuring the gang switch 50 are all ON, and the expression that the gang switch 50 is OFF refers to that the three switches (54 to 56) are all OFF. The gang switch 50, when turned ON, connects between the first inverter 120 and the second motor 260 so that current can be passed therethrough in the state in which the second switch 250 is ON, and connects between the second inverter 220 and the first motor 160 so that current can be passed therethrough in the state in which the first switch 150 is ON. When the gang switch 50 is turned OFF, the first inverter 120 and the second motor 260 are disconnected from each other so that current cannot be passed therethrough, while the second inverter 220 and the first motor 160 are disconnected from each other so that current cannot be passed therethrough.

Referring back to FIG. 1, a further description will be provided. The host ECU 10 includes a determination unit 14 and a control unit 15. The determination unit 14 determines whether traction of the first wheel 190 and the second wheel 290 is abnormal. Specifically, for example, if the rotating speed of the first wheel 190 or the second wheel 290 is higher than that of other wheels, traction can be determined to be abnormal.

Furthermore, for example, the vehicle 400 may include a first tire pressure monitoring system (TPMS) that detects tire pressure of the first wheel 190, and a second tire pressure monitoring system (TPMS) that detects tire pressure of the second wheel 290. If the tire pressure detected by these systems is low, the determination unit 14 can determine the traction as being abnormal. This is because, if the tire pressure is low, there is a high probability that traction is reduced due to the tire floating, or the like.

In the following description, if traction of neither of the first wheel 190 and and the second wheel 290 is determined to be abnormal by the determination section 14, this state is referred to as a normal state. Also, of the first and second wheels 190 and 290, if traction of only the first wheel 190 is determined to be abnormal by the determination unit 14, this state is referred to as a first abnormal state, and if traction of only the second wheel 290 is determined to be abnormal, this state is referred to as a second abnormal state. In addition, if traction of both the first second wheels 190 and 290 is determined to be abnormal by the determination unit 14, this state is referred to as a dual abnormal state.

In the first abnormal state, the second drive system 200 inputs the second motor information i2 into not only the second control unit 210 but also the first control unit 110, Also, in the second abnormal state, the first drive system 100 inputs the first motor information i1 into not only the first control unit 110 but also the second control unit 210.

In the normal state, the control unit 15 establishes a normal state s0 in which the first and second switches 150 and 250 are ON and the gang switch 50 is OFF. In the first abnormal state, a first countermeasure state s1 is established in which the first switch 150 is OFF, the second switch 250 is ON, and the gang switch 50 is ON. In the second abnormal state, a second countermeasure state s2 is established in which the first switch 150 is ON, the second switch 250 is OFF, and the gang switch 50 is ON.

Figure 3:
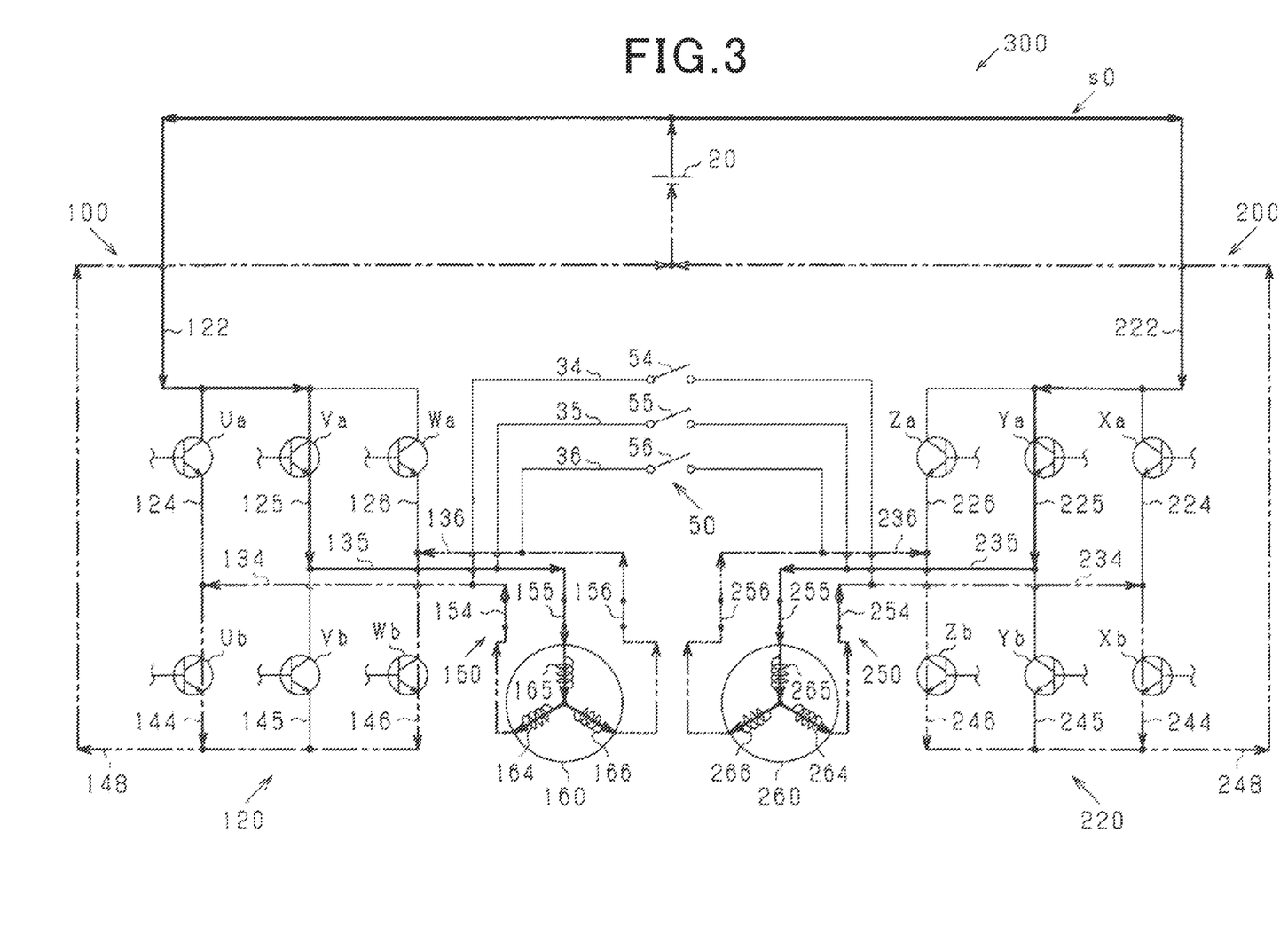
FIG. 3 is a circuit diagram illustrating a rotating body drive system in a normal state.

FIG. 3 is a circuit diagram illustrating the vehicle drive system 300 in the normal state s0. It should be noted that, although the figure shows the U-phase lower switch Ub, the V-phase upper switch Va, and the W-phase lower switch Wb as being ON, and the X-phase lower switch Xb, the Y-phase upper switch Ya, and the Z-phase lower switch Zb as being ON, this is a state at a predetermined moment. The upper switches (Ua, Va, Wa, Xa, Ya, Za) and the lower switches (Ub, Vb, Wb, Xb, Yb, Zb) repeat ON and OFF states at individual predetermined timings to switch directions of the current passed through the motors (160, 260). The same applies to FIGS. 4 and 5.

In the normal state s0 shown in FIG. 3, the first inverter 120 supplies current to the first motor 160 to drive the first motor 160, while the second inverter 220 supplies current to the second motor 260 to drive the second motor 260.

In the normal state s0, the first motor 160 is driven with power that is equal to or lower than predetermined first upper limit power which is determined by the performance (critical power) of the first inverter 120. Furthermore, the second motor 260 is driven with power that is equal to or lower than predetermined second upper limit power which is determined by the performance (critical power) of the second inverter 220. It should be noted that, in the present embodiment, the first upper limit power is equal to the second upper limit power.

Figure 4:
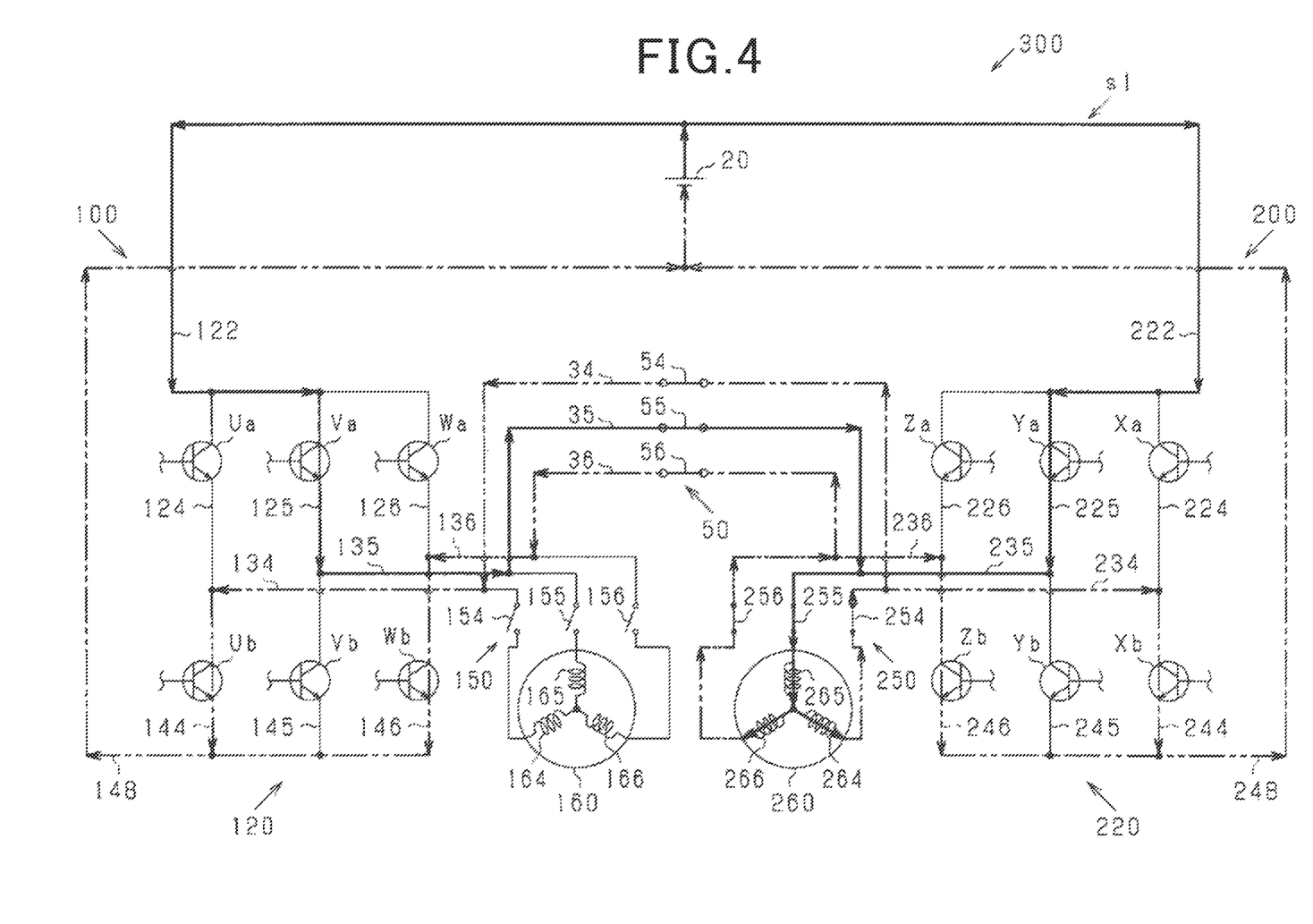
FIG. 4 is a circuit diagram illustrating a rotating body drive system in a first countermeasure state.

FIG. 4 is a circuit diagram illustrating the vehicle drive system 300 in the first countermeasure state s1. In the first countermeasure state s1, the first switch 150 is OFF and therefore the first inverter 120 does not supply current to the first motor 160. On the other hand, since the second switch 250 and the gang switch 50 are ON, the second inverter 220 and the first inverter 120 supply current to the second motor 260 to drive the second motor 260 with both inverters 120 and 220.

Specifically, in the first countermeasure state s1, the second drive system 200 inputs the second motor information i2 into not only the second control unit 210 but also the first control unit 110 as mentioned above. The first control unit 110 controls the switches (Ua, Va, Wa, Ub, Vb, Wb) of the first inverter 120 using the second motor information i2 to control the first inverter 120 driving the second motor 260.

In the first countermeasure state s1, cooperation between the inverters (120, 220) produces power higher than the second upper limit power to drive the second motor 260 with the produced power. However, the period of driving the second motor 260 with the power higher than the second upper limit power should be within a predetermined second time limit. The second time limit is time which is determined based on the time taken for the second motor 260 to cause predetermined deterioration in performance by being driven with the power higher than the second upper limit power.

Specifically, the predetermined deterioration in performance may be, for example, demagnetization of the rotor magnets or short circuiting of a predetermined circuit, due to overheat of the second motor 260. The second time limit may be a constant or a variable which is determined based on the magnitude of current passing through the second motor 260 or the temperature of the second motor 260. The second time limit, if it is a variable, may be obtained using a map or may be obtained using a function.

In the first countermeasure state s1, if the period of driving the second wheel 290 with power higher than the second upper limit power exceeds the second time limit, the state may be returned to the normal state s0, or the first countermeasure state s1 may be kept unchanged with the power of the inverters 120 and 220 reduced.

Figure 5:
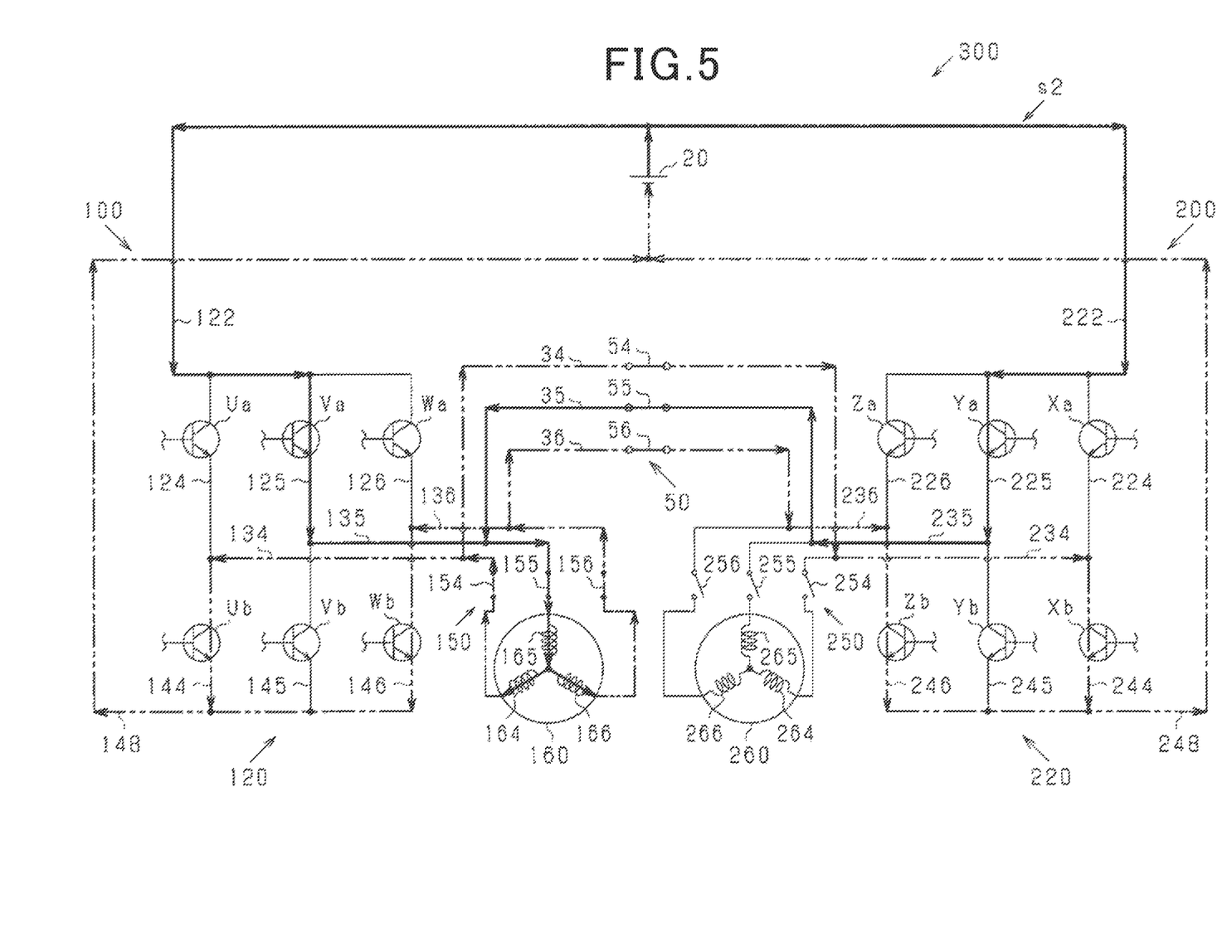
FIG. 5 is a circuit diagram illustrating a rotating body drive system in a second countermeasure state.

FIG. 5 is a circuit diagram illustrating the vehicle drive system 300 in the second countermeasure state s2. In the second countermeasure state s2, the second switch 250 is OFF and therefore the second inverter 220 does not supply current to the second motor 260. On the other hand, since the first switch 150 and the gang switch 50 are ON, the first inverter 120 and the second inverter 220 supply current to the first motor 160 to drive the first motor 160 with both inverters 120 and 220.

The second countermeasure state s2 can be more specifically described by reading the above description for the first countermeasure state s1 as follows. Specifically, the terms first and second can be read in reverse, and the reference signs can be read as corresponding reference signs.

Figure 6:
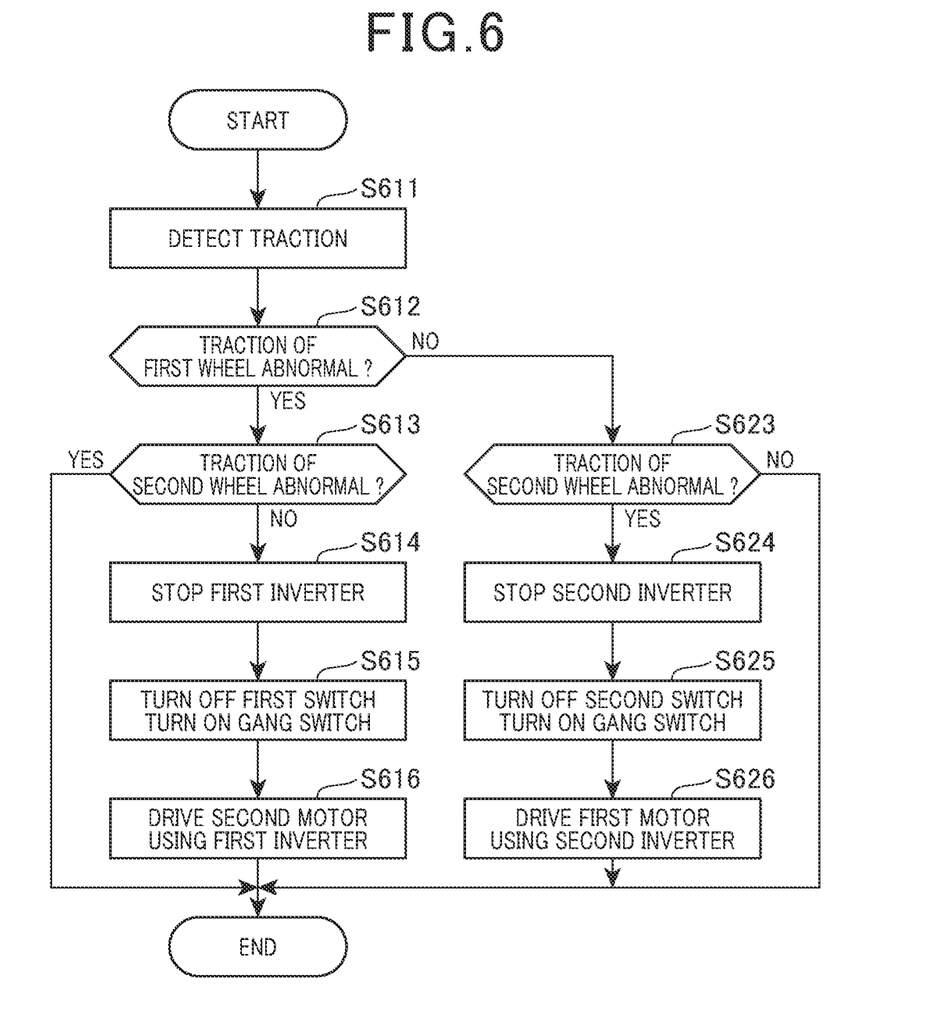
FIG. 6 is a flowchart illustrating connection control.

FIG. 6 is a flowchart illustrating connection control performed by the host ECU 10. The initial state is the normal state s0. From this state, first, the determination unit 14 detects information related to traction of the first wheel 190 and the second wheel 290 (S611). Next, it is determined whether traction of the first wheel 190 is abnormal (S612).

If traction of the first wheel 190 is determined to be abnormal at S612 (YES at S612), it is determined whether traction of the second wheel 290 is abnormal (S613). If traction of the second wheel 290 is determined to be abnormal (YES at S613), this means that the dual abnormal state is established in which traction of both wheels is abnormal, and therefore, the connection control is terminated, with the normal state s0 unchanged.

On the other hand, if traction of the second wheel 290 is determined not to be abnormal at S613 (NO at S613), this means that the first abnormal state is established in which only traction of the first wheel 190 is abnormal, and therefore, the first motor 160 is stopped being driven by the first inverter 120 (S614). Then, the first switch 150 is turned OFF and at the same time the gang switch 50 is turned ON (S615) to change state to the first countermeasure state s1. Then, the first inverter 120 starts driving the second motor 260 (S616) so that the second motor 260 is driven by both inverters 120 and 220. In this state, the connection control is terminated.

On the other hand, if traction of the first wheel 190 is determined not to be abnormal at S612 (NO at S612), it is determined whether traction of the second wheel 290 is abnormal (S623). If traction of the second wheel 290 is determined not to be abnormal (NO at S623), this means that the normal state is established in which traction of neither of the wheels is abnormal, and therefore the connection control is terminated, with the normal state s0 unchanged.

On the other hand, if traction of the second wheel 290 is determined to be abnormal at S623 (YES at S623), this means that the second abnormal state is established in which only traction of the second wheel 290 is abnormal, and therefore the second motor 260 is stopped being driven by the second inverter 220 (S624). Then, the second switch 250 is turned OFF and at the same time the gang switch 50 is turned ON (S625) to change state to the second countermeasure state s2. Then, the second inverter 220 starts driving the first motor 160 (S626) so that the first motor 160 is driven by both inverters 120 and 220. In this state, the connection control is terminated.

It should be noted that, after terminating the connection control, the following control is performed. Specifically, if the state has been changed to the first countermeasure state s1 under the connection control, state is returned to the normal state s0 under conditions that traction of the first wheel 190 has become normal. Furthermore, if the state has been changed to the second countermeasure state s2 under the connection control, state is returned to the normal state s0 under conditions that traction of the second wheel 290 has become normal.

Furthermore, in the first countermeasure state s1, if the period of driving the second wheel 290 with power higher than the second upper limit power has exceeded the second time limit, state is returned to the normal state s0, or the first countermeasure state s1 is kept unchanged with the power of the inverters 120 and 220 reduced. Also, in the second countermeasure state s2, if the period of driving the first wheel 190 with power higher than the first upper limit power has exceeded the first time limit, state is returned to the normal state s0, or the second countermeasure state s2 is kept unchanged with the power of the inverters 120 and 220 reduced.

Figure 7A:
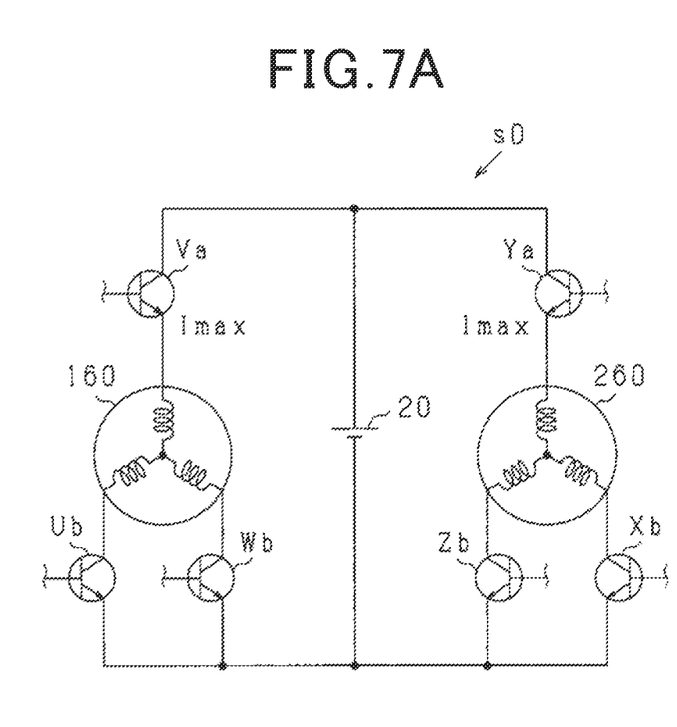
FIGS. 7A and 7B are simplified circuit diagrams of the circuit diagrams shown in FIGS. 4 and 5, respectively.
Figure 7B:
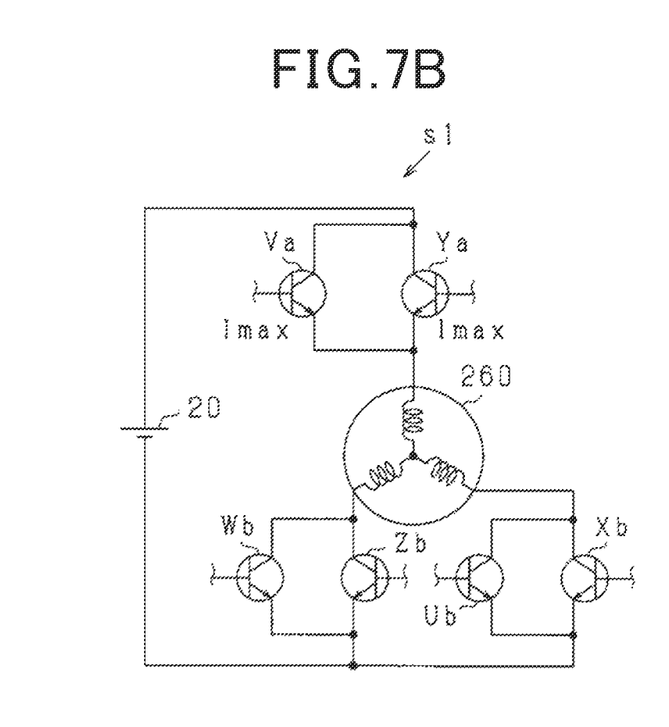

According to the present embodiment, the following advantageous effects can be achieved. In the first abnormal state in which traction of the first wheel 190 is abnormal, the second motor 260 is driven by both inverters (120, 220) so that torque of the second wheel 290 can be enhanced. Details of this will be described referring to FIG. 7. In the following description, the maximum value of current that can be passed through the upper switches (Ua, Va, Wa, Xa, Ya, Za) and the lower switches (Ub, Vb, Wb, Xb, Yb, Zb) is referred to as Imax.

If the circuit at a predetermined moment in the normal state s0 shown in FIG. 3 is simplified by omitting circuit through which no current is passed, a circuit diagram as shown in FIG. 7A can be obtained. Herein, the positive terminal of the battery 20 and the second motor 260 are connected to each other via one upper switch (Ya). On the other hand, the negative terminal of the battery 20 and the second motor 260 are connected to each other via two lower switches (Xb, Zb) which are parallel to each other. Therefore, the maximum value of current that can be passed through the second motor 260 corresponds to the maximum value (Imax) of current that can be passed through the single upper switch (Ya).

If the circuit at a predetermined moment in the first countermeasure state s1 shown in FIG. 4 is simplified by omitting circuits through which no current is passed, a circuit as shown in FIG. 7B can be obtained. Herein, the positive terminal of the battery 20 and the second motor 260 are connected to each other via two upper switches (Va, Ya) which are parallel to each other. On the other hand, the negative terminal of the battery 20 and the second motor 260 are connected to each other via four lower switches (Ub, Wb, Xb, Zb) which are parallel to each other. Therefore, the maximum value of current that can be passed through the second motor 260 corresponds to the maximum value (2×Imax) of total current that can be passed through the two upper switches (Va, Ya).

As described above, while an Imax current at a maximum can be passed through the second motor 260 in the normal state s0, a 2×Imax current at a maximum can be passed through the second motor 260 in the first countermeasure state s1. Therefore, in the first countermeasure state s1, the second motor 260 can output about twice the power of the maximum power (second upper limit power) of the normal state s0.

Therefore, in the first abnormal state in which the first wheel 190 has been caught in mud, snow, or the like on the road surface or run on a frozen road, torque of the second wheel 290 can be sufficiently enhanced by changing state into the first countermeasure state s1. Thus, the vehicle 400 can be brought into a state of easily moving out of the mud, snow, or the like on the road surface or the frozen road, without the need of providing a second inverter 220 having high power.

Similarly, in the second abnormal state in which the second wheel 290 has been caught in mud, snow, or the like on the road surface or run on a frozen road, torque of the first wheel 190 can be sufficiently enhanced by changing state into the second countermeasure state s2. Thus, the vehicle 400 can be brought into a state of easily moving out of the mud or the like on the road surface, without the need of providing a first inverter 120 having high power.

Specifically, in the present embodiment, the first wheel 190 is a left wheel, and the second wheel 290 is a right wheel. Accordingly, in the first abnormal state in which the first wheel 190 as a left wheel has been caught in mud or the like on the road surface and traction has been deteriorated, the vehicle 400 can be brought into a state of easily moving out of the mud or the like by changing state into the first countermeasure state s1 and enhancing torque of the second wheel 290 as a right wheel. On the contrary, in the second abnormal state in which the second wheel 290 as a right wheel has been caught in mud or the like on the road surface and traction has been deteriorated, the vehicle 400 can be brought into a state of easily moving out of the mud or the like by changing state into the second countermeasure state s2 and enhancing torque of the first wheel 190 as a left wheel.

Furthermore, in the first countermeasure state s1, the second drive system 200 inputs the second motor information i2 into the first control unit 110, and accordingly, the first control unit 110 can use the second motor information i2 to control the first inverter 120 driving the second motor 260, without any problem. Similarly, in the second countermeasure state s2, the first drive system 100 inputs the first motor information i1 into the second control unit 210, and accordingly, the second control unit 210 can use the first motor information i1 to control the second inverter 220 driving the first motor 160, without any problem.

When changing state from the normal state s0 to the first countermeasure state s1, the first inverter 120 is caused to stop driving the first motor 160, and then the first switch 150 is turned OFF and at the same time the gang switch 50 is turned ON for change of state into the first countermeasure state s1. Thus, the first switch 150 is turned OFF after current is stopped passing therethrough. Therefore, compared to the case where the first switch 150 is turned OFF while current is passed therethrough, insulation breakdown is unlikely to occur between the terminals of the first switch 150. Thus, withstand voltage required of the first switch 150 can be minimized.

Similarly, when changing state from the normal state s0 to the second countermeasure state s2, the second inverter 220 is caused to stop driving the second motor 260, and then the second switch 250 is turned OFF and at the same time the gang switch 50 is turned ON for change of state into the second countermeasure state s2. Thus, withstand voltage required of the second switch 250 can be minimized as in the case of the first switch 150.

Furthermore, in the first countermeasure state s1, the second inverter 220 drives the second motor 260 with power higher than the second upper limit power within a predetermined second time limit. The second time limit is determined based on the time taken for the second motor 260 to cause predetermined deterioration in performance by being driven with power higher than the second upper limit power. Thus, the second motor 260 can be prevented from causing the deterioration in performance.

Similarly, in the second countermeasure state s2, the first inverter 120 drives the first motor 160 with power higher than the first upper limit power within a predetermined first time limit. The first time limit is determined based on the time taken for the first motor 160 to cause predetermined deterioration in performance by being driven with power higher than the first upper limit power. Thus, the first motor 160 can be prevented from causing the deterioration in performance.

Other Embodiments

The embodiment described above can be modified and implemented as follows. For example, the first drive system 100 may drive both the right and left front wheels instead of driving only the left front wheel, and the second drive system 200 may drive both the right and left rear wheels instead of driving only the right rear wheel. In other words, the first wheel 190 may be both of the right and left front wheels, and the second wheel 290 may be both of the right and left rear wheels. In this case, for example, if the front wheels as the first wheel 190 are caught in mud or the like on the road surface, torque can be concentrated on the rear wheels as the second wheel 290 to bring the vehicle into a state of easily moving out of the mud or the like.

Also, for example, the second switch 250 may be omitted so that state is changed from the normal state s0 to the first countermeasure state s1 only in the first abnormal state, and that, in the second abnormal state, the normal state s0 remains unchanged without changing state to the second countermeasure state s2. In this case, for example, the wheels, which are preferred to be set as the first wheel 190, are the shoulder side wheels among the right and left wheels, the rear side wheels among the front and rear wheels, or the like, which are more likely to be caught in mud, show, or the like on the road surface or run on a frozen road.

Furthermore, for example, the circuit diagrams (FIGS. 2 to 5 and 7) indicate the upper switches (Ua, Va, Wa, Xa, Ya, Za) and the lower switches (Ub, Vb, Wb, Xb, Yb, Zb) with normal symbols of transistors; however, these switches may be MOSFETs, IGBTs, or the like.

Also, for example, the vehicle drive system 300 may be used as a drone drive system that drives the propellers of drones. Specifically, for example, in the case where a drone has four propellers, i.e., front-left, front-right, rear-left, and rear-right propellers, the front-left and rear-right propellers as first diagonal propellers may be driven using the first motor 160, and the front-right and rear-left propellers as second diagonal propellers may be driven using the second motor 260. In this case, for example, in the occurrence of malfunctions, such as damage, in the first diagonal propellers, power can be concentrated on the second diagonal propellers to perform soft landing or the like using power of the second diagonal propellers.

The present disclosure has been described based on embodiments; however, the present disclosure should not be construed as being limited to these embodiments or structures. The scope of the present disclosure should encompass various modifications or equivalents. In addition, various combinations, or modes, and further, other combinations or modes including one or more additional elements or fewer elements of the various combinations or modes should also be included within the category or idea of the present disclosure.

What is claimed is:

1. A rotating body drive system including a first motor driving a predetermined first rotating body, a second motor driving a second rotating body different from the first rotating body, a first inverter driving the first motor, and a second inverter driving the second motor, the rotating body drive system comprising:
   a first switch that, when turned ON, connects between the first inverter and the first motor so that current can be passed therethrough and that, when turned OFF, disconnects the connection;
   a gang switch that, when turned ON, connects between the first inverter and the second motor so that current can be passed therethrough and that, when turned OFF, disconnects the connection;
   a determination unit that determines whether the first rotating body is in an abnormal state; and
   a control unit that controls the first switch and the gang switch, wherein
   in a case where the determination unit determines that there is no abnormality in the state of the first rotating body, the control unit establishes a normal state in which the first switch is ON and the gang switch is OFF to cause the first inverter to drive the first motor, while causing the second inverter to drive the second motor; and
   in a case where the determination unit determines that there is abnormality in the state of the first rotating body, the control unit establishes a first countermeasure state in which the first switch is OFF and the gang switch is ON to cause both the first inverter and the second inverter to drive the second motor.

2. The rotating body drive system according to claim 1, wherein
   the first rotating body is one of right and left wheels of a vehicle, and the second rotating body is the other of right and left wheels; and
   the determination unit determines whether traction is abnormal as a determination as to whether the state is abnormal.

3. The rotating body drive system according to claim 1, further comprising
   a first drive system including the first motor, the first inverter, and a predetermined first control unit that controls the first inverter; and
   a second drive system including the second motor, the second inverter, and a predetermined second control unit that controls the second inverter, wherein
   in the first countermeasure state, the second drive system inputs predetermined information obtained based on the second motor being driven, into the first control unit; and
   the first control unit uses the predetermined information to control the first inverter driving the second motor.

4. The rotating body drive system according to claim 1, wherein
   when changing the normal state to the first countermeasure state, the first motor is stopped being driven by the first inverter while in the normal state, and then the first switch is turned OFF for change into the first countermeasure state.

5. The rotating body drive system according to claim 1, wherein
   in the normal state, the second inverter is caused to drive the second motor with power that is equal to or lower than predetermined upper limit power and, in the first countermeasure state, the first inverter and the second inverter are caused to cooperate with each other to produce power higher than the upper limit power within a predetermined time limit so that the second motor is driven; and
   the time limit is time which is determined based on time taken for the second motor to cause predetermined deterioration in performance by being driven with power higher than the upper limit power.

6. A rotating body drive system including a first motor driving a predetermined first rotating body, a second motor driving a second rotating body different from the first rotating body, a first inverter driving the first motor, and a second inverter driving the second motor, the rotating body drive system comprising:
   a first switch that, when turned ON, connects between the first inverter and the first motor so that current can be passed therethrough and that, when turned OFF, disconnects the connection;
   a second switch that, when turned ON, connects between the second inverter and the second motor so that current can be passed therethrough and that, when turned OFF, disconnects the connection;

a gang switch that, when turned ON, connects between the first inverter and the second motor so that current can be passed therethrough in a state in which the second switch is ON, and connects between the second inverter and the first motor so that current can be passed therethrough in a state in which the first switch is ON and that, when turned OFF, disconnects the first inverter and the second motor from each other so that no current can be passed therethrough, and disconnects the second inverter and the first motor from each other so that no current can be passed therethrough;

a determination unit that determines whether the first rotating body and the second rotating body are in an abnormal state; and a control unit that controls the first switch, the second switch, and the gang switch, wherein in a case where the determination unit determines that neither of the first rotating body and the second rotating body has abnormality in traction, the control unit establishes a normal state in which the first switch is ON, the second switch is ON, and the gang switch is OFF to cause the first inverter to drive the first motor, while causing the second inverter to drive the second motor;

in a case where the determination unit determines that there is abnormality in the state of the first rotating body, the control unit establishes a first countermeasure state in which the first switch is OFF, the second switch is ON, and the gang switch is ON to cause both the first inverter and the second inverter to drive the second motor; and in a case where the determination unit determines that there is abnormality in the state of the second rotating body, the control unit establishes a second countermeasure state in which the first switch is ON, the second switch is OFF, and the gang switch is ON to cause both the first inverter and the second inverter to drive the first motor.

7. The rotating body drive system according to claim 6, wherein the first rotating body is one of right and left wheels of a vehicle, and the second rotating body is the other of right and left wheels; and the determination unit determines whether traction is abnormal as a determination as to whether the state is abnormal.

8. The rotating body drive system according to claim 6, further comprising a first drive system including the first motor, the first inverter, and a predetermined first control unit that controls the first inverter; and a second drive system including the second motor, the second inverter, and a predetermined second control unit that controls the second inverter, wherein in the first countermeasure state, the second drive system inputs predetermined information obtained based on the second motor being driven, into the first control unit; and the first control unit uses the predetermined information to control the first inverter driving the second motor.

9. The rotating body drive system according to claim 6, wherein when changing the normal state to the first countermeasure state, the first motor is stopped being driven by the first inverter while in the normal state, and then the first switch is turned OFF for change into the first countermeasure state.

10. The rotating body drive system according to claim 6, wherein in the normal state, the second inverter is caused to drive the second motor with power that is equal to or lower than predetermined upper limit power and, in the first countermeasure state, the first inverter and the second inverter are caused to cooperate with each other to produce power higher than the upper limit power within a predetermined time limit so that the second motor is driven; and the time limit is time which is determined based on time taken for the second motor to cause predetermined deterioration in performance by being driven with power higher than the upper limit power.

* * * * *